United States Patent
Jansen

(10) Patent No.: US 8,193,110 B2
(45) Date of Patent: Jun. 5, 2012

(54) REFRACTORY CARBON-BONDED MAGNESIA BRICK AND PROCESS FOR PRODUCING IT

(75) Inventor: Helge Jansen, Friedland (DE)

(73) Assignee: Refratechnik Holding GmbH, Ismaning (DE)

( * ) Notice: Subject to any disclaimer, the term of this patent is extended or adjusted under 35 U.S.C. 154(b) by 107 days.

(21) Appl. No.: 12/530,408

(22) PCT Filed: Feb. 26, 2008

(86) PCT No.: PCT/EP2008/052312
§ 371 (c)(1), (2), (4) Date: Sep. 8, 2009

(87) PCT Pub. No.: WO2008/107343
PCT Pub. Date: Sep. 12, 2008

(65) Prior Publication Data
US 2010/0093515 A1    Apr. 15, 2010

(30) Foreign Application Priority Data
Mar. 7, 2007   (DE) .......................... 10 2007 011 133

(51) Int. Cl.
*C04B 35/04*   (2006.01)
(52) U.S. Cl. ........................................ 501/109; 501/108
(58) Field of Classification Search .................. 501/108, 501/109
See application file for complete search history.

(56) References Cited

U.S. PATENT DOCUMENTS

| | | | | |
|---|---|---|---|---|
| 4,208,214 A | * | 6/1980 | Stein et al. ..................... | 501/101 |
| 5,250,479 A | * | 10/1993 | Rancoule et al. ............. | 501/101 |
| 5,262,367 A | | 11/1993 | Sundell | |
| 2007/0161496 A1 | * | 7/2007 | Aneziris et al. ................. | 501/99 |

FOREIGN PATENT DOCUMENTS

| | | |
|---|---|---|
| DE | 2 201 541 | 8/1972 |
| GB | 1071536 | 6/1967 |
| JP | 5-004861 | 1/1993 |
| JP | 5-330904 | 12/1993 |
| WO | WO 91/14661 | 10/1991 |
| WO | 2005068391 | * 7/2005 |

OTHER PUBLICATIONS

"Mesophase Pitch and Phenolic Resin Blends as Binders for Magnesia—Graphited Bricks," by Koichi Kanno et al., Institute of Advanced Material Study, Kyusyu University, Japan, Received Oct. 3, 1997, from Carbon 37 (1999) pp. 195-201.

"Magnesia-Carbon Bricks—A High-Duty Refractory Material," by C. G. Aneziris et al., Interceram Refractories Manual 2003, pp. 22-28.

"Pocket Manual—Refractory Materials," by Gerald Routschka, ISBN 3-8027-3147-6, Vulkan-Verlag Essen, pp. 135-153, 1997.

* cited by examiner

*Primary Examiner* — Karl Group
(74) *Attorney, Agent, or Firm* — Brinks Hofer Gilson & Lione

(57) ABSTRACT

The invention relates to a refractory, ceramically fired, carbon-bonded magnesia brick whose matrix is more than 70% by weight, in particular from 80 to 98% by weight, of MgO grains and also a carbon framework binder matrix resulting from carbonization, and pores, wherein the MgO grains are fixed by means of carbon bonding of the carbon framework and at least 30%, in particular from 50 to 100%, of the MgO grains have at least one sintering bridge resulting from the ceramic firing.

17 Claims, 5 Drawing Sheets

REFRACTORY CARBON-BONDED MAGNESIA BRICK AND PROCESS FOR PRODUCING IT

CROSS REFERENCE TO RELATED APPLICATION

This application claims priority to PCT/EP2008/052312 filed Feb. 26, 2008 and DE 10 2007 011 133.0 filed Mar. 7, 2007.

FIELD OF THE INVENTION

The invention relates to a refractory carbon-bonded magnesia brick and a process for producing it.

BACKGROUND OF THE INVENTION

Fired carbon-containing magnesia bricks are known. These bricks are produced by mixing classified magnesia granules and flours with a binder which ensures sufficient strength for handling and subsequently pressing and firing at from 1500 to 1800° C. The fired bricks are then impregnated with pitch at from 150° C. to 200° C. under reduced pressure. As a result of pyrolysis during use of the bricks, carbon packets which hinder infiltration of, for example, slag constituents or gases are formed from the pitch. The internal bonding of the bricks results from sintering bridges formed between the magnesia grains during firing. It is possible to achieve a residual carbon content of about 2% by weight in these bricks.

In addition, unfired, carbon-bonded magnesia bricks are used mainly as linings in steel equipment in the steel industry. These bricks are produced by mixing classified magnesia flours with pitch as binder at from 100° C. to 200° C. and pressing the mixtures hot. This is followed by heating at from 250° C. to 350° C., resulting in formation of a carbon bonding phase in the form of a carbon framework from the pitch. Disadvantages are that unburned hydrocarbons, which are hazardous to health, can be liberated after installation of the bricks and during heating in the steel production apparatus, and undesirable pressure softening of the bricks occurs.

To avoid these disadvantages and to avoid the energy-consuming hot pressing, synthetic resins in the form of liquid phenol resoles or phenol-novolak solutions are used as binders and pressing is carried out cold at room temperatures using a hardener or hot at temperatures in the range from room temperature to below 100° C. Curing is subsequently carried out at from 120° C. to 200° C., resulting in crosslinking of the resin to form an infusible resin lattice which likewise results in carbon bonding.

The carbon bonding, which ensures handling strength of the bricks after pyrolysis or heat treatment, is retained even when the bricks are used at high temperatures. Apart from the carbon bonding, the carbon, which largely fills in the interstices between the magnesia grains, also drastically hinders infiltration when the bricks come into contact with slags and gases.

Furthermore, magnesia-carbon bricks are known. Graphite is mixed together with the binder which affects the carbon bonding into the batch for producing these bricks, as a result of which a higher carbon content in the bricks and, associated therewith, increased hindering of infiltration can be achieved. Pitch or synthetic resin is used as the binder.

To achieve carbon bonding, it is desirable for very substantial graphitization of the carbon to occur by means of pyrolysis. This is achieved more readily when using pitch than when using synthetic resin. The graphitization of synthetic resin can be considerably improved by the use of graphitization aids as described in EP 1 280 743 B1.

The carbon ensures mainly the bonding of the unfired bricks and a reduction in wear as a result of infiltration being hindered. In addition, the thermal shock resistance and the thermal conductivity, in particular, are increased and the thermal expansion is reduced.

Bonding of the bricks results essentially from the adhesion between the carbon framework of the binder and the magnesia grains and also, in particular, from the cohesion within the carbon framework. In this context, it is known that weakening of the microstructure in the interior of the bricks can occur as a result of redox reactions during operation at high temperatures. The carbon participates in these redox reactions are partly burned out (see Gerald Routschka, Taschenbuch "Feuerfeste Werkstoffe", 3rd edition, Vulkan-Verlag, Essen, p. 172, paragraph 3 to p. 173, FIG. 2).

SUMMARY OF THE INVENTION

It is an object of the invention to provide carbon-bonded magnesia bricks in which the microstructure-weakening effects of redox reactions during operation are largely avoided.

This object is achieved by a carbon-bonded magnesia brick and a process for making such carbon-bonded magnesia brick as described in the following disclosure.

The invention accordingly provides a refractory, ceramically fired, carbon-bonded magnesia brick whose matrix comprises over 70%, in particular from 80% to 98%, of MgO grains composed of periclase and also a carbon framework binder matrix resulting from carbonization, and pores, wherein the MgO grains are fixed by means of carbon bonding of the carbon framework and at least 30%, in particular from 50% to 100%, of the MgO grains have at least one sintering bridge resulting from the ceramic firing.

The magnesia brick of the invention also has, in particular, a residual carbon content after reducing ignition at 1000° C. (ASTM C 831-93) of at least 2% by weight, in particular from 5% to 25% by weight.

The magnesia brick of the invention advantageously has a floc graphite content mixed with the carbon framework binder matrix of from 2% to 25% by weight, in particular from 5% to 20% by weight. In particular, the carbon framework comprises no substances which release hydrocarbons when the temperature is increased. Secondary phases in the fired brick can be, for example, dicalcium silicate, calcium oxide, dicalcium ferrite, or gangue types of graphite in amounts of up to 5% by weight. The MgO grains have, for example, grain sizes up to 8 mm, in particular in the range from 0 to 6 mm, with the following grain size distribution of the MgO grains preferably being present:

| Grain size (mm) | Proportion (% by weight) |
|---|---|
| 2-4 | 25-40 |
| 1-2 | 5-30 |
| 0.063-1 | 10-25 |
| <0.063 | 15-30 |

The hot flexural strength at 1500° C. of the magnesia bricks of the invention is, in particular, in the range from 1.5 MPa to 6 MPa, in particular from 3 MPa to 5 MPa, and the cold compressive strength is in the range from 10 MPa to 40 MPa, in particular from 20 MPa to 35 MPa, and the modulus of elasticity is in the range from 1 MPa to 15 MPa, in particular from 4 MPa to 10 MPa. The porosity is advantageously from 5% to 20% by volume, in particular from 8% to 15% by volume.

The brick of the invention is produced by firing an unfired, heat-treated or not yet heat-treated magnesia brick containing a carbon binder such as pitch or synthetic resin at temperatures above 1200° C., with the firing conditions, in particular a reducing atmosphere, the firing time and the temperature profile, being set so that gaseous magnesium distributed homogeneously through the entire brick is formed from magnesia as a result of redox reactions involving the carbon present in the brick, according to the reaction shown in Equation 1.

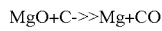

Eq. 1

The gaseous Mg is oxidized by oxygen available in the brick to form secondary magnesia (secondary MgO) and deposits directly on existing primary magnesia grains. It is surprising that the carbon does not burn out to an appreciable extent if at all, but instead somehow remains in the brick, with the carbon framework and thus carbon bonding remaining virtually unchanged and, as a result, no—or no appreciable—weakening of the microstructure occurring.

It is also surprising that secondary MgO forms sintering bridges between existing primary magnesia grains to an appreciable extent, resulting in ceramic bonding in the manner of sintering bonding in addition to the carbon bonding. This sintering bonding is obviously formed at temperatures at which MgO sintering would normally not yet take place in a carbon-free MgO brick during firing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
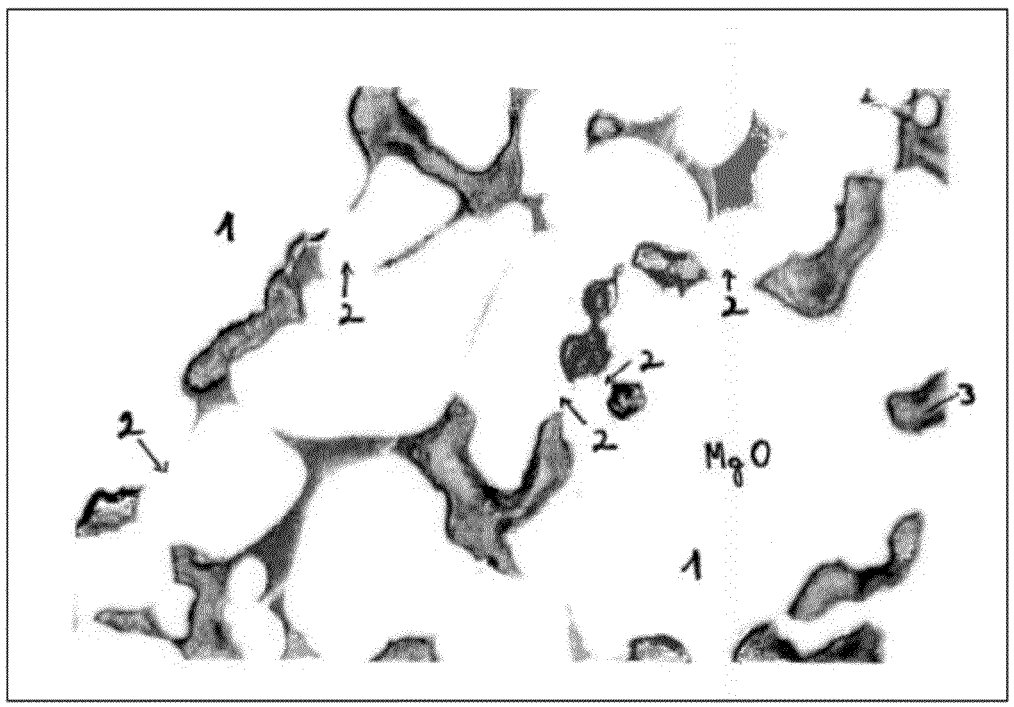
FIG. 1 is an electron micrograph image showing the matrix of a carbon-free magnesia brick bonded by sintering.

The following description is merely exemplary in nature and is in no way intended to limit the present disclosure or its application or uses. It should be understood that throughout the description and drawings, corresponding reference numerals indicate like or corresponding parts and features.

A brick within the meaning of the invention is a shaped body. Magnesia is mainly sintered magnesia or fused magnesia which comprises the main mineral phase periclase (MgO) and is produced, for example, by sintering or melting magnesite (MgCO$_3$) or else Mg(OH)$_3$ obtained from seawater or brines.

Figure 2:
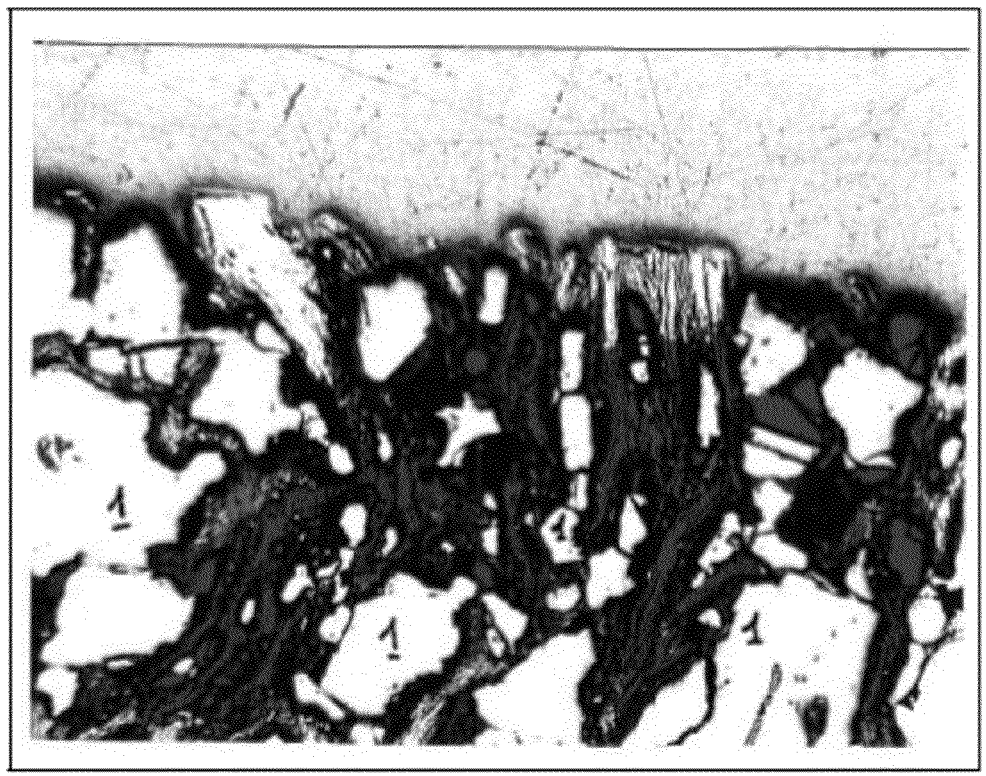
FIG. 2 is an electron micrograph image showing the matrix of an unfired carbon-bonded magnesia-carbon brick.
Figure 3:
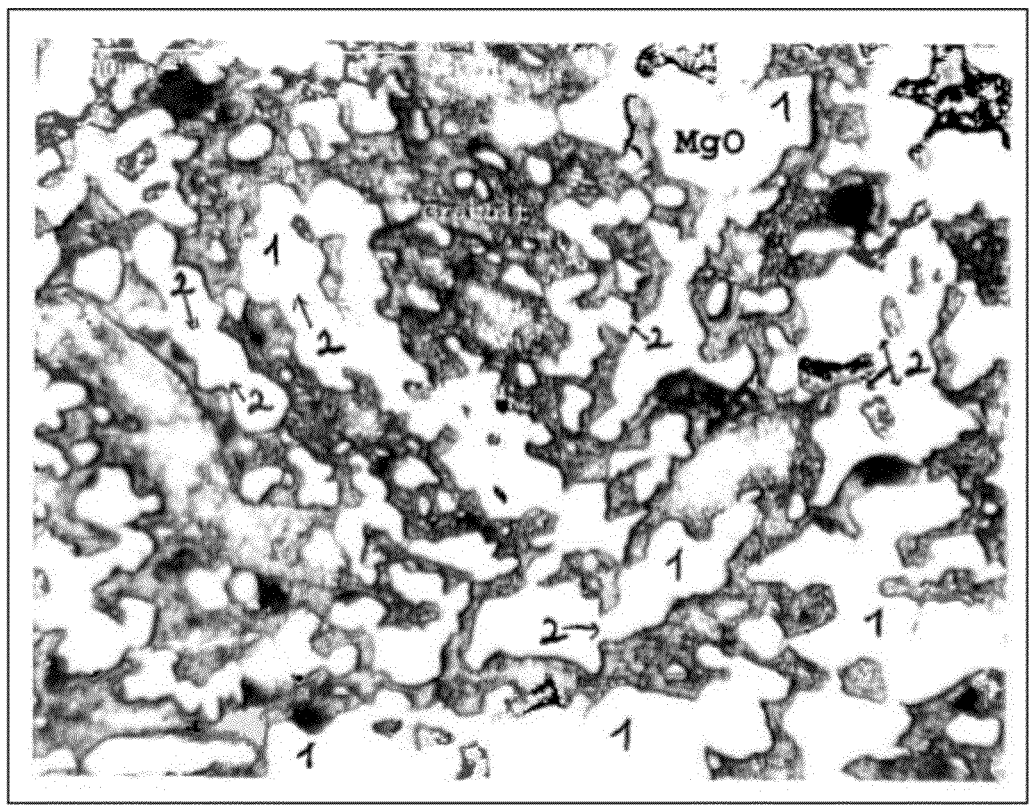
FIG. 3 is an electron micrograph image showing an embodiment of a magnesia-carbon brick according to the present invention.

The electron micrographs of FIGS. 1 to 3 inter alia illustrate the invention. FIG. 1 shows the matrix of a carbon-free magnesia brick bonded by sintering. It is possible to see numerous magnesia grains 1 of differing sizes as light areas which are ceramically bound to one another via sintering bridges 2. The dark areas 3 represent pores.

FIG. 2 shows the matrix of an unfired carbon-bonded magnesia-carbon brick. The light areas represent the MgO grains 1 in the form of large to fine grains. Between the grains there is the carbon framework and graphite as dark matrix areas. It can be seen that the MgO grains are not connected to one another via sintering bridges but are kept apart by the carbon.

FIG. 3 shows the matrix of a still unused, carbon-bonded, fired magnesia-carbon brick according to the invention, produced using 10% by weight of graphite and 3% by weight of binder resin with heat treatment at 200° C. and firing at 1500° C. Apart from the light MgO grains 1, the dark areas representing the carbon can clearly be recognized. The primary MgO grains 1 are connected to one another via sintering bridges 2 which have very probably arisen as a result of deposition of secondary MgO formed from the Mg gas phase on primary MgO grains.

The processes involved in the changes in the matrix of the MgO bricks of the invention during firing have not yet been elucidated. It is possible that the carbon particles which are located between the primary MgO grains and act as a sintering barrier are displaced or relocated, or the carbon which reacts in the redox reaction frees routes for the sintering bridges and subsequently redeposits on carbon and/or MgO particles or is given off as CO gas.

It is surprising that sintering bridges can be produced at below normal sintering temperatures without adversely affecting the carbon bonding when particular ceramic firing conditions are adhered to, with the sintering bridges increasing at least the strength of the brick. It is advantageous for from 30% to 100%, preferably from 50% to 100%, of the primary MgO grains to be sintered together.

Figure 4:
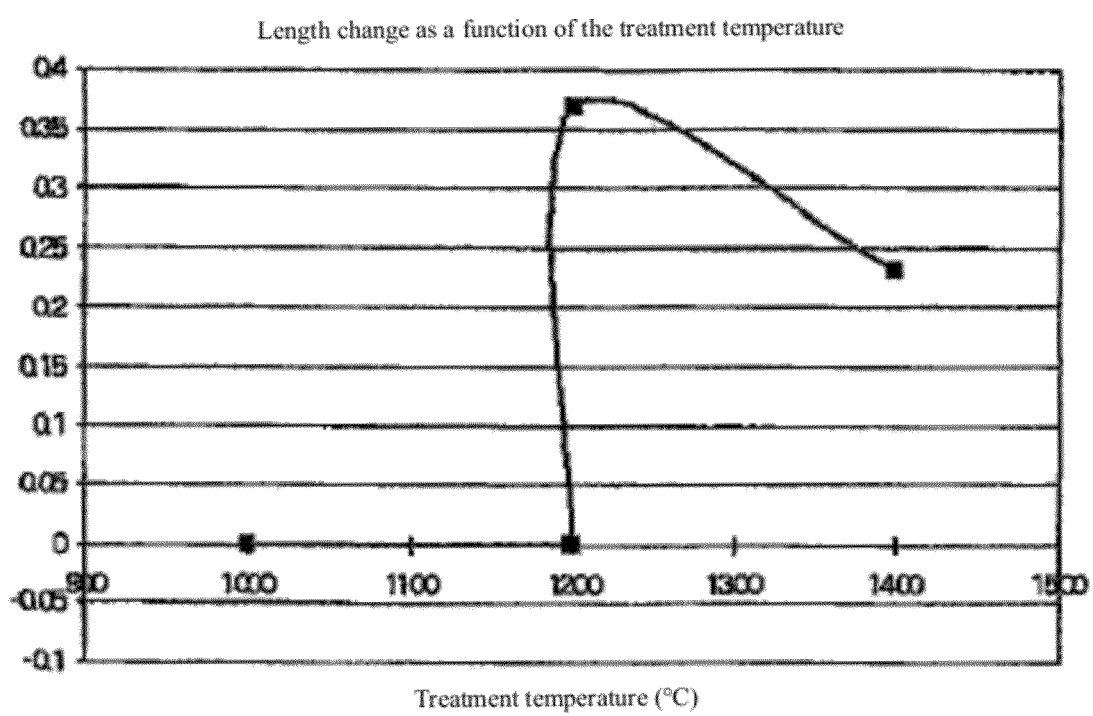
FIG. 4 is a graph showing the length change, after firing, of a magnesia-carbon brick of the present invention.

It is important that the firing temperature is above 1200° C., as can be seen from FIG. 4. The graph in FIG. 4 shows the length change in % of an initially unfired, carbon-bonded magnesia-carbon brick after firing at 1000° C., 1200° C. and 1400° C. The treatment was carried out for 6 hours after heating up at each of the temperatures indicated, with exclusion of oxygen.

According to FIG. 4, the reaction of the bricks commences significantly at 1200° C. with a step increase in length. The bricks then shrink and compact as a result of sintering. The formation of the new sintering bonds strengthens the bricks in addition to the carbon bonding.

Figure 5:
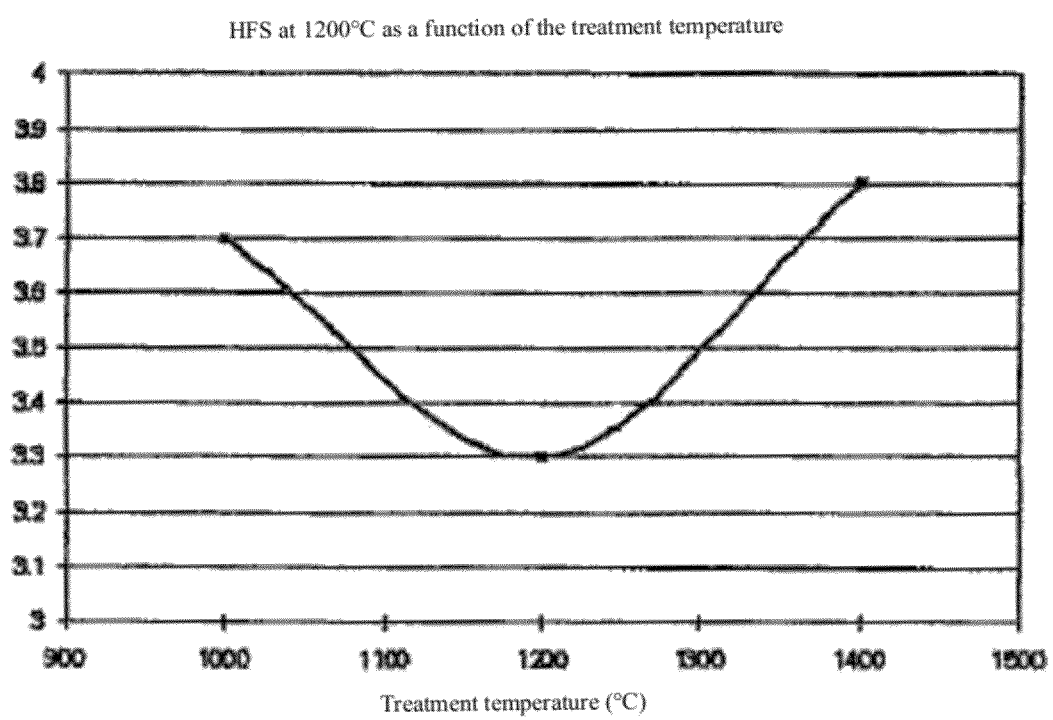
FIG. 5 is a graph of hot flexural strength of bricks treated according to the present invention.

FIG. 5 shows the strengthening of the bricks treated as per FIG. 4 as a graph of the hot flexural strength (HFS) which characterizes the bricks in use. This goes through a minimum at 1200° C. and then increases greatly as a result of, in particular, the formation of the new sintering bonds.

The following mixes are preferably used for producing fired bricks according to the invention.

1. Pitch-bonded magnesia bricks
    83%-95% by weight of fused magnesia (MgO content=97.5% by weight)
    2%-14% by weight of floc graphite
    2%-4% by weight of pitch binder
2. Resin-bonded, graphite-containing magnesia bricks
    72%-95% by weight of fused magnesia (MgO content=97.5% by weight)
    2%-25% by weight of floc graphite
    2%-4% by weight of phenolic resin After production of the batches, green bricks are formed by pressing. This is followed by heat treatment of the green bodies at temperatures of from 150° C. to 250° C. when using phenolic resin and from 400° C. to 600° C. when using pitch binder until the binder has been carbonized and carbon bonding of the magnesia grains has occurred. The ceramic firing of these shaped bodies, which have sufficient handling strength because of the carbon bonding, is carried out in a reducing atmosphere at from above 1200° C. to preferably 1500° C., in particular in the range from 1300° C. to 1400° C., until at least 10%, in particular from 50% to 100%, of the magnesia grains have been sintered to at least one other magnesia grain by means of a sintering bridge to form secondary magnesia grains. It is advantageous for ceramic firing to be continued until secondary magnesia grains having more than two sintering bridges predominate (more than 50%). The heat treatment and the ceramic firing are preferably carried out in direct succession in the same firing apparatus.

The carbon-bonded magnesia bricks are heated at heating rates of from 0.5° C. to 5° C./minute, in particular from 2° C. to 3° C./minute, to from 1200° C. to 1500° C., in particular to from 1300° C. to 1400° C., and fired at the respective temperature for from 2 to 10 hours, in particular from 5 to 6 hours, and subsequently cooled at cooling rates of from 0.5° C. to 5° C./minute, in particular from 2° C. to 3° C./minute.

The matrix of the fired carbon-bonded magnesia bricks of the invention comprises from 70% to 98% by weight, in particular from 80% to 95% by weight, of MgO grains 1; the balance in each case is carbon framework or carbon framework plus graphite, with from 10% to 100%, in particular from 50% to 70%, of the MgO grains 1, being sintered to one another by means of sintering bridges 2.

A person skilled in the art will recognize that all of the measurements described are standard measurements that can be obtained by a variety of different test methods. The test methods described throughout the specification represent only one available method capable of obtaining each of the desired measurements.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A refractory, ceramically fired, carbon-bonded magnesia brick, the matrix of which has more than 70% by weight of primary and secondary MgO grains of periclase and a carbon framework binder matrix resulting from carbonization of 2% to 4% by weight of a carbon binder, the remainder being at least one of graphite and secondary phases, and pores, wherein the MgO grains are fixed by way of a carbon bond, and at least 30% of the primary MgO grains are sintered together with at least one other primary MgO grain in each case by way of at least one secondary MgO sintering bridge resulting from the ceramic firing.

2. The magnesia brick of claim 1 having a residual carbon content after reducing carbonization at 1000° C. (ASTM C 831-93) of at least 2% by weight.

3. The magnesia brick of claim 2, wherein the graphite is floc graphite in an amount of at least 2% to 25% by weight.

4. The magnesia brick of claim 2 wherein the carbon framework does not comprise any substances which liberate hydrocarbons when the temperature is increased to 1200° C.

5. The magnesia brick of claim 1, wherein the secondary phases include dicalcium silicate, calcium oxide, dicalcium ferrite or gangue types of graphite and are present in amounts of up to 5% by weight in the fired brick.

6. The magnesia brick of claim 1 having a hot flexural strength in the range from 1.5 MPa to 6 MPa.

7. The magnesia brick of claim 1 having a cold compressive strength in the range from 10 MPa to 40 MPa.

8. The magnesia brick of claim 1 having a modulus of elasticity in the range from 1 MPa to 15 MPa.

9. The magnesia brick of claim 1 having a porosity in the range from 5% to 20% by volume.

10. The magnesia brick of claim 6 having a hot flexural strength in the range from 3 MPa to 5 MPa.

11. The magnesia brick of claim 9 having a porosity in the range from 8% to 15% by volume.

12. The magnesia brick of claim 1, wherein the matrix includes from 80% to 98% by weight of MgO grains.

13. The magnesia brick of claim 1 wherein 50% to 100% of the primary MgO grains are sintered together with at least one other primary MgO grain in each case by way of at least one secondary MgO sintering bridge resulting from the ceramic firing.

14. The magnesia brick of claim 2 having a residual carbon content after reducing calcination at 1000° C. (ASTM C 831-93) in the range from 5% to 25% by weight.

15. The magnesia brick of claim 7 having a cold compressive strength in the range from 20 MPa to 35 MPa.

16. The magnesia brick of claim 8 having a modulus of elasticity in the range from 4 MPa to 10 MPa.

17. The magnesia brick of claim 3 having a floc graphite content in the range of 5% to 20% by weight.

* * * * *